(12) United States Patent
Lai

(10) Patent No.: US 8,868,134 B2
(45) Date of Patent: Oct. 21, 2014

(54) HANDHELD DEVICE AND POWER SAVING METHOD THEREFOR

(75) Inventor: Yu-Peng Lai, Taoyuan County (TW)

(73) Assignee: High Tech Computer, Corp., Taoyuan (TW)

( * ) Notice: Subject to any disclaimer, the term of this patent is extended or adjusted under 35 U.S.C. 154(b) by 765 days.

(21) Appl. No.: 12/453,795

(22) Filed: May 22, 2009

(65) Prior Publication Data

US 2009/0298549 A1    Dec. 3, 2009

(30) Foreign Application Priority Data

May 29, 2008 (TW) ................................ 97119837 A

(51) Int. Cl.
*H04M 1/00* (2006.01)
*H04W 52/02* (2009.01)
*H04M 1/22* (2006.01)

(52) U.S. Cl.
CPC .............. *H04W 52/027* (2013.01); *H04M 1/22* (2013.01); *Y02B 60/50* (2013.01)
USPC .......................................... 455/566; 370/338

(58) Field of Classification Search
CPC .................... G05B 2219/37286; G01J 3/0275; G01J 2005/068
USPC .............................. 455/566; 348/14.01–14.07
See application file for complete search history.

(56) References Cited

U.S. PATENT DOCUMENTS

2005/0231156 A1 * 10/2005 Yan ................................ 320/107
2006/0087245 A1 * 4/2006 Ng et al. ........................ 315/149
2008/0140868 A1 * 6/2008 Kalayjian et al. .................. 710/8

FOREIGN PATENT DOCUMENTS

| CN | 1519623 A | 8/2004 |
| TW | 200813704 | 9/2006 |
| TW | M313841 | 12/2006 |

OTHER PUBLICATIONS

Office action of the Chinese application No. 200810137616.8.
Office Action issued Sep. 8, 2011 in corresponding Taiwanese application No. 97119837.

* cited by examiner

*Primary Examiner* — Marcos Batista
(74) *Attorney, Agent, or Firm* — Bacon & Thomas, PLLC

(57) ABSTRACT

The present invention provides a handheld device comprising: a processor, which is electrically connected to a light sensor. When the processor determines that a phone call event has occurred, the processor will enable the light sensor to control the display. Moreover, the present invention provides a power saving method for a handheld device that will execute the following steps when a phone call event occurs: measuring an ambient brightness value of the handheld device; continuing determining whether a change of the ambient brightness values satisfies at least one predetermined condition; and turning off a display of the handheld device if the change satisfies the predetermined condition.

25 Claims, 2 Drawing Sheets

HANDHELD DEVICE AND POWER SAVING METHOD THEREFOR

BACKGROUND OF THE INVENTION

1. Field of the Invention

The present invention relates to a handheld device and a power saving method therefor. More particularly, the present invention utilizes a light sensor to detect the change of ambient brightness in different receiver modes. Accordingly, the display status of the handheld device can be determined.

2. Description of the Related Art

Increasing the operation time has always been an important issue for users of handheld devices, such as mobile phones or PDAs, as well as for the industry. Not all of the components of a handheld device need to be powered on when the handheld device is in use. Therefore, shutting down certain functions or turning off certain components that the user is not using at proper times may help save some power.

Generally, the screen of a handheld device consumes quite much power. Therefore, the conventional handheld devices typically use the built-in software to set a predetermined time duration. When a handheld device has been idling for some time longer than the predetermined time duration, the handheld device will turn off the screen automatically to save power. However, the conventional handheld devices do not allow the screens to be automatically turned off while the user is answering a phone call or making an dialing call. The handheld device will not turn off the screen until a predetermined time duration is reached. It is known that the user does not need to use the screen while speaking with a handheld device. Thus, the conventional handheld devices may cause unnecessary power consumption, which leads to the decrease of operation time.

To overcome the above drawback, the present invention provides a handheld device and a power saving method therefor. This invention uses a light sensor for determining whether the user is holding the device close to the ear while answering or placing calls; based on the determination result, the handheld device can further shut down certain functions or turn off certain components that are not in use. Therefore, power consumption can be effectively reduced, and longer operation time can be achieved with a handheld device of this invention. There are a few handheld device products in the market that are capable of turning off screens while making calls. However, such products need to further integrate a cap sensor or proximity sensor to achieve the aforementioned objectives. The present invention only employs a light sensor for saving power and increasing battery lifetime. Thus, the present invention can also help reducing production cost.

SUMMARY OF THE INVENTION

An object of the invention is to provide a power-saving handheld device.

Another object of the invention is to provide a handheld device and a power saving method for it. Once a phone call event occurs, a light sensor of the handheld device detects the change of ambient brightness so as to determine the display mode of the handheld device.

To achieve the above objects, the present invention provides a handheld device with a display, the handheld device comprising a processor, which is electrically connected to a light sensor. When the processor determines that a phone call event has occurred, the processor will enable the light sensor in order to control the display.

The phone call event is that the handheld device receives an incoming call or makes a dialing call.

The processor further determines whether to turn off the display based on whether a measurement result from the light sensor satisfies at least one predetermined condition.

After the phone call event occurs, the processor acquires a measurement value measured by the light sensor as a base value and continues comparing the base value with subsequent measurement values to generate the measurement result.

When the processor cannot determine within a predetermined period of time that the measurement result from the light sensor satisfies the predetermined condition, then after that, the processor will turn off the display.

The predetermined condition is the change of said measurement value measured by said light sensor of the base value corresponding to the change range of ambient brightness.

When the base value is greater than a threshold value, the processor will determine whether the measurement result from the light sensor satisfies a first predetermined condition. The first predetermined condition is the change of said measurement value measured by said light sensor of the base value corresponding to the change range of ambient brightness in relatively brighter surroundings.

When the standard value is smaller than a threshold value, the processor will determine whether the measurement result from the light sensor satisfies a second predetermined condition. The second predetermined condition is the change of said measurement value measured by said light sensor of the base value corresponding to the change range of ambient brightness in relatively darker surroundings.

To achieve the above-mentioned objects, the present invention further provides a power saving method for a handheld device that will execute the following steps when a phone call event occurs: measuring a brightness value of the handheld device; continuing determining whether a change of the ambient light values satisfies at least one predetermined condition; and turning off a display of the handheld device if the change satisfies the predetermined condition.

The above power saving method further comprises the step of: turning off the display after the handheld device cannot determine within a predetermined period of time whether the change satisfies the predetermined condition.

DETAILED DESCRIPTION OF THE PREFERRED EMBODIMENTS

These and other features, aspects, and advantages of the invention will be described in more detail below with reference to the preferred embodiments and accompanying drawings.

Figure 1:
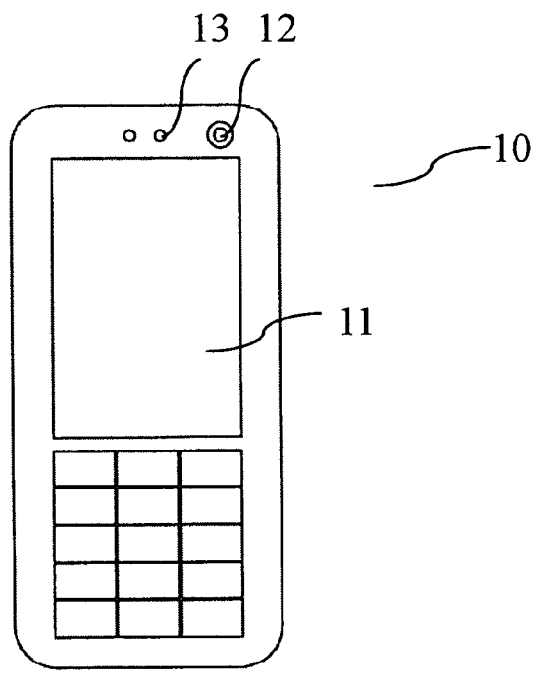
FIG. 1 is a front view of a handheld device of the present invention.

FIG. 1 shows a front view of a handheld device 10 of the present invention. In an exemplary embodiment, the handheld device 10 is represented by a mobile phone. However, it should be noted that the handheld device of the present invention is not limited hereto; the device may be any handheld device or electronic device equipped with phone functionality, such as a PDA, digital camera, etc. The handheld device 10 comprises a receiver 13 and a light sensor 12 located next to that the receiver 13, the light sensor 12 senses the ambient brightness around the receiver 13. It is preferable that the light sensor 12 is located at a position that can be covered by a user's ear when the receiver 13 is held close to it. Since the light sensor 12 can sense the change of ambient brightness around the receiver 13, the handheld device 10 can further make a determination as to whether the user using the device in a handed receiver mode or in a hands-free receiver mode.

Figure 2:
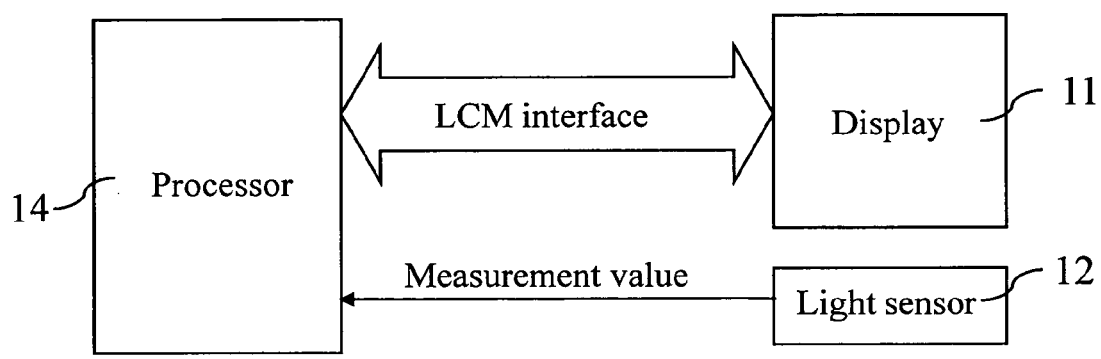
FIG. 2 is a block diagram of a preferred embodiment of the present invention.

FIG. 2 is a system block diagram illustrating one preferred embodiment of a handheld device 10. In this embodiment, the handheld device 10 with a display 11 comprises a processor 14 electrically connected to a light sensor 12. When the processor 14 determines that a phone call event has occurred on the handheld device 10, the processor 14 will enable the light sensor 12 to sense an initial measurement value of the ambient brightness. The phone call event means that the user decides whether to answer an incoming call or not, or whether to make a dialing call or not, and operates the handheld device 10. After the phone call event occurs, the user may answer in a handed receiver mode or hands-free receiver mode, and the processor 14 can determine which mode the device is in based on the change of measurement values that the light sensor 12 senses. Moreover, the processor 14 is connected to the display 11 using an LCM interface. When a measurement result measured by the processor 14 satisfies at least one predetermined condition, the processor 14 will turn off the display 11 in order to save power. That is to say, other than adjusting the brightness of backlight module according to different operation conditions, the use of a light sensor of the present invention leads to turning off the display to save power when a phone call event occurs.

Figure 3:
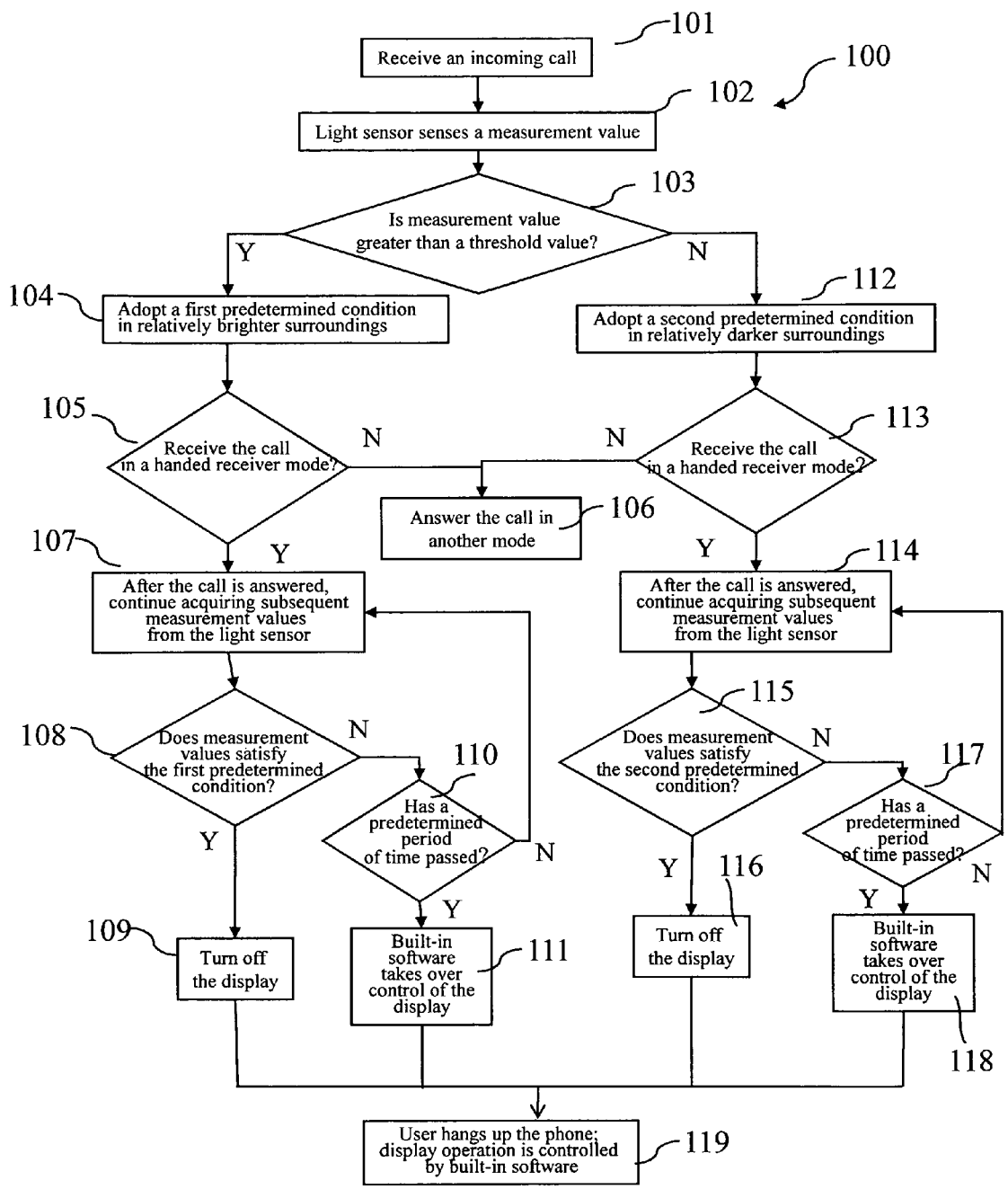
FIG. 3 is a flow chart illustrating a power saving method of the present invention.

FIG. 3 is a flow chart illustrating a power saving method of the present invention. By way of example, the phone call event described here is represented in the manner of receiving an incoming call. When the user operates the handheld device 10 to answer an incoming call (step 101), the processor 14 will enable the ambient light sensor 12 to sense an initial measurement value (step 102). The measurement value is to be used as a base value measured around the handheld device 10 before the user begins answering the call. When the receiver 13 of the handheld device 10 is held close to the user's ear, the change range of measurement values depends on different operation conditions, such as the ambient brightness, the handheld device is under. Therefore, it is necessary to have different predetermined conditions for the handheld device 10 under different operation conditions. Once the incoming call is answered, the processor 14 will first determine whether a measurement value measured by the light sensor 12 is greater than a threshold value (step 103). Then, the processor 14 determines whether to adopt a standard associated with relatively brighter surroundings, or a standard associated with relatively darker surroundings for the handheld device 10. If the measurement value is greater than the threshold value, the processor 14 determines that the handheld device 10 is in relatively brighter surroundings. The processor 14 then adopts a first predetermined condition to determine whether the user is answering the phone by holding the handheld device 10 close to the ear (steps 107 and 114).

Since it may take different time for a user to hold the handheld device 10 close to the ear, the first predetermined condition may be set over various time samplings. When the change, which is within a preset range, of measurement values measured by the light sensor 12 satisfies the first predetermined condition, it means that the user has already held the handheld device 10 close to the ear.

Based on the change of measurement values measured by the light sensor 12, the processor 14 further determines whether the handheld device 10 is receiving the call in a handed receiver mode (step 105). If the handheld device 10 is not in the handed receiver mode (for example, it may be in a hands-free receiver mode), the processor 14 will control the display 11 using the settings for the hands-free receiver mode (step 106).

If the user answers the call using the handed receiver mode, the processor 14 of the handheld device 10 will continue acquiring subsequent measurement values from the light sensor 12 (step 107) and further determine whether the change of the measurement values satisfies the above-mentioned first predetermined condition (step 108). If the change of the measurement values satisfies the first predetermined condition, the processor 14 will turn off the display 11 (step 109); the display 11 will be off till the user hangs up the phone, and then the display operation will be controlled by the built-in software (step 119). By contrast, if the change of measurement values does not satisfy the first predetermined condition, or if the handheld device is unable to reach a determination, the processor 14 will determine whether a predetermined period of time has passed (step 110). Generally, the predetermined period of time may be several seconds or several minutes that can be preset by the user or use a default setting, and if the predetermined period of time has passed, the processor 14 will turn off the display 11 or the built-in software will take over the control of the display 11 (step 111). If the predetermined period of time has not passed yet, the process will return to steps 107 and 108; once the user hangs up the phone, the display operation will be controlled by the built-in software again (step 119). As such, when the ambient light sensor 12 cannot sense measurement values under certain conditions, the display 11 can still be forcibly turned off or switched to other power-saving mode to conserve power.

Moreover, the handheld device 10 of this preferred embodiment can also determine the answering mode in darker surroundings. The light sensor 12 utilized in this preferred embodiment can have different sensitivities set to detect the brightness change. When the handheld device 10 is used to pick up an incoming call, the processor 14 will determine that the device is in darker surroundings if the measurement value is smaller than the threshold value. Then, a second predetermined condition will be adopted to determine whether the user has held the handheld device 10 close to the ear, which means the handheld device 10 is in the handed receiver mode (step 112).

The time samplings for setting the second predetermined condition are taken in relatively darker surroundings. When the change of measurement values measured by the ambient light sensor 12 satisfies the second predetermined condition, it means the user has already held the handheld device 10 close to the ear.

The processor 14 further determines whether the handheld device is in the handed receiver mode (step 113). If the handheld device 10 is not in the handed receiver mode (for example, it may be in a hands-free receiver mode), the processor 14 will control the display 11 using the settings for the hands-free receiver mode (step 106).

If the user answers the call using the handed receiver mode, the processor 14 of the handheld device 10 will continue acquiring subsequent ambient light values from the light sensor 12 (step 114) and further determine whether the change of the measurement values satisfies the above-mentioned second predetermined condition (step 115). If the change of the measurement values satisfies the second predetermined condition, the processor 14 will turn off the display 11 (step 116);

the display 11 will be off till the user hangs up the phone, and then the display operation will be controlled by the built-in software (step 119). By contrast, if the change of measurement values does not satisfy the second predetermined condition, or if the handheld device is unable to reach a determination, the processor 14 will determine whether a predetermined period of time has passed (step 117). If the predetermined period of time has passed, the processor 14 will turn off the display 11 or the built-in software will take over the control of the display 11 (step 118); once the user hangs up the phone, the display operation will be controlled by the built-in software (step 119). If the predetermined period of time has not passed yet, the process will return to steps 114 and 115. As such, when the sensor 12 cannot sense measurement values under certain conditions, the display 11 can still be forcibly turned off or switched to other power-saving mode to conserve power.

On the other hand, the phone call event includes making a dialing call. When the user makes a dialing call, the processor 14 will go through the same process described above to determine whether the user has held the handheld device 10 close to the ear, i.e. to determine whether the handheld device 10 is placing the dialing call in the handed receiver mode or hands-free receiver mode. And then the processor 14 determines whether to turn off the display in order to save power. Therefore, the handheld device 10 can turn off the display either when receiving incoming calls or when making dialing calls. As a result, power can be saved effectively with the use of the handheld device 10.

What is claimed is:

1. A handheld device with a display, comprising:
   a processor, electrically connected to a light sensor and a receiver, the light sensor being located next to the receiver;
   wherein said processor is configured to determine whether a phone call event occurs;
   wherein said processor is configured to, when a phone call event has occurred, enable said light sensor to detect an initial ambient brightness value of the handheld device;
   wherein said processor is configured to adopt a first predetermined condition or a second predetermined condition based on said initial brightness value;
   wherein said processor is configured to determine, whether the handheld device is in a handed receiver mode or in a hands-free receiver mode after said phone call event occurs;
   wherein the processor is configured to, when the handheld device is in the handed receiver mode, enable said light sensor to detect a subsequent brightness value and to turn off the display based on the subsequent brightness value and the first or second predetermined condition; and
   the processor is configured to, when the handheld device is in the hands-free receiver mode, control the display based on the settings for the hands-free receiver mode.

2. The handheld device of claim 1, wherein said processor further determines whether to turn off said display based on a measurement result from said light sensor whether to satisfy at least one predetermined condition.

3. The handheld device of claim 2, wherein said processor determines to turn off said display within a predetermined period of time when said measurement result from said light sensor satisfies said predetermined condition.

4. The handheld device of claim 2, wherein said processor turns off said display after said processor cannot determine within a predetermined period of time whether said measurement result from said light sensor satisfies said predetermined condition.

5. The handheld device of claim 2, wherein after said phone call event occurs, said processor acquires a measurement value measured by said light sensor as a base value and continues comparing said base value with subsequent measurement values to generate said measurement result.

6. The handheld device of claim 5, wherein said predetermined condition is the change of said measurement value measured by said light sensor about said base value corresponding to the change range of ambient brightness; said predetermined condition comprise a first predetermined condition and a second predetermined condition.

7. The handheld device of claim 6, wherein when said base value is greater than a threshold value, said processor will determine whether said measurement result from said light sensor satisfies said first predetermined condition, said first predetermined condition being the change of said measurement value measured by said light sensor about said base value corresponding to the change range of ambient brightness in relatively brighter surroundings.

8. The handheld device of claim 6, wherein when said base value is smaller than a threshold value, said processor will determine whether said measurement result from said light sensor satisfies said second predetermined condition, said second predetermined condition being the change of said measurement value measured by said light sensor about said base value corresponding to the change range of ambient brightness in relatively darker surroundings.

9. The handheld device of claim 6, wherein when said handheld device is in a handed receiver mode, said processor turns off said display based on said measurement result from said light sensor.

10. The handheld device of claim 1, wherein when said handheld device is in a hands-free receiver mode, said processor controls said display based on the settings for said hands-free receiver mode.

11. The handheld device of claim 1, wherein said phone call event is that said handheld device receives an incoming call.

12. The handheld device of claim 1, wherein said phone call event is that said handheld device makes a dialing call.

13. A power saving method for a handheld device, executing the following steps:
    enabling a light sensor located next to a receiver to detect an initial ambient brightness value of the handheld device after a phone call event occurs;
    based on the initial ambient brightness value, adopting a first or a second predetermined condition;
    determining whether the handheld device is in a handed receiver mode or in a hands-free receiver mode;
    wherein if the handheld device is in said handed receiver mode, the power saving method comprises the following steps:
    detecting a second ambient brightness value of said handheld device by said light sensor;
    determining whether a change of said ambient brightness values satisfies the adopted predetermined condition; and
    turning off a display of said handheld device if said change satisfies said predetermined condition.

14. The power saving method of claim 13, further comprising the step of: determining within a predetermined period of time that said change satisfies said predetermined condition and turning off said display thereafter.

15. The power saving method of claim 13, further comprising the step of: turning off said display when said handheld device cannot determine within a predetermined period of time whether said change satisfies said predetermined condition.

16. The power saving method of claim 13, wherein said predetermined condition is the corresponding change range of said ambient brightness values.

17. The power saving method of claim 13, further comprising the step of: setting said ambient brightness value as a base value when said phone call event occurs; then adopting a second predetermined condition when said base value is smaller than a threshold value, or adopting a first predetermined condition when said base value is greater than said threshold value.

18. The power saving method of claim 17, wherein said first predetermined condition is said base value corresponding to the change range of ambient brightness values in relatively brighter surroundings.

19. The power saving method of claim 17, wherein said second predetermined condition is said standard value corresponding to the change range of ambient light values in relatively darker surroundings.

20. The power saving method of claim 17, further comprising the step of: said handheld device being able to enter a handed receiver mode when said phone call event occurs and then deciding whether to turn off said display by determining whether said change satisfies said predetermined condition.

21. The power saving method of claim 13, wherein said phone call event is that said handheld device receives an incoming call.

22. The power saving method of claim 13, wherein said phone call event is that said handheld device makes a dialing call.

23. The power saving method of claim 13, further comprising the following steps: performing a display operation based on the settings for said a hands-free receiver mode if said handheld device is in said hands-free receiver mode.

24. The power saving method of claim 23, wherein said phone call event is that said handheld device receives an incoming call.

25. The power saving method of claim 23, wherein said phone call event is that said handheld device makes a dialing call.

* * * * *